(12) United States Patent
Salter et al.

(10) Patent No.: US 10,569,696 B2
(45) Date of Patent: Feb. 25, 2020

(54) VEHICLE ILLUMINATED AIRFLOW CONTROL DEVICE

(71) Applicant: Ford Global Technologies, LLC, Dearborn, MI (US)

(72) Inventors: Stuart C. Salter, White Lake, MI (US); Paul Kenneth Dellock, Northville, MI (US); Terry R. Lobsinger, Farmington Hills, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 15/477,453

(22) Filed: Apr. 3, 2017

(65) Prior Publication Data

US 2018/0281666 A1 Oct. 4, 2018

(51) Int. Cl.
| | | |
|---|---|---|
| B60Q 1/26 | (2006.01) | |
| B60R 19/50 | (2006.01) | |
| B60Q 1/28 | (2006.01) | |
| G02B 27/00 | (2006.01) | |
| F21S 43/20 | (2018.01) | |
| F21S 43/14 | (2018.01) | |
| B60R 13/00 | (2006.01) | |
| B60K 11/08 | (2006.01) | |
| B60Q 1/30 | (2006.01) | |
| B60Q 1/00 | (2006.01) | |
| F21S 43/145 | (2018.01) | |

(Continued)

(52) U.S. Cl.
CPC ............ *B60Q 1/2661* (2013.01); *B60K 11/08* (2013.01); *B60Q 1/0035* (2013.01); *B60Q 1/28* (2013.01); *B60Q 1/30* (2013.01); *B60R 13/005* (2013.01); *B60R 19/50* (2013.01); *F21S 43/14* (2018.01); *F21S 43/145* (2018.01); *F21S 43/16* (2018.01); *F21S 43/26* (2018.01); *G02B 27/0006* (2013.01); *B60R 2019/1886* (2013.01); *B60R 2019/486* (2013.01); *B60R 2019/505* (2013.01); *F21W 2103/20* (2018.01); *F21W 2103/50* (2018.01); *F21W 2103/55* (2018.01)

(58) Field of Classification Search
CPC .......... F21S 43/14; F21S 43/145; F21S 43/16; F21S 43/26
See application file for complete search history.

(56) References Cited

U.S. PATENT DOCUMENTS 2,486,859 A  11/1949 Meijer et al.
4,554,617 A * 11/1985 Tyler .................. B60Q 1/18
362/418

(Continued)

FOREIGN PATENT DOCUMENTS

CN  101337492 A  1/2009
CN  201169230 Y  2/2009
(Continued)

*Primary Examiner* — Zheng Song
(74) *Attorney, Agent, or Firm* — Vichit Chea; Price Heneveld LLP (57) ABSTRACT

A light system is provided herein. The light system includes a bumper assembly disposed on a vehicle. A light source is disposed on the bumper assembly. An airflow control device is disposed below the bumper assembly. A first luminescent structure is disposed on the airflow control device. The first luminescent structure is configured to luminesce in response to receiving excitation light.

20 Claims, 5 Drawing Sheets

(51) Int. Cl.
*F21S 43/16* (2018.01)
*B60R 19/48* (2006.01)
*B60R 19/18* (2006.01)
*F21W 103/50* (2018.01)
*F21W 103/55* (2018.01)
*F21W 103/20* (2018.01)

(56) References Cited

U.S. PATENT DOCUMENTS

| | | | |
|---|---|---|---|
| 5,053,930 A | 10/1991 | Benavides | |
| 5,434,013 A | 7/1995 | Fernandez | |
| 5,709,453 A | 1/1998 | Krent et al. | |
| 5,796,094 A * | 8/1998 | Schofield | B60N 2/002 250/208.1 |
| 5,839,718 A | 11/1998 | Hase et al. | |
| 6,031,511 A | 2/2000 | DeLuca et al. | |
| 6,117,362 A | 9/2000 | Yen et al. | |
| 6,264,354 B1 * | 7/2001 | Motilal | B60Q 1/0483 362/371 |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,555,184 B1 * | 4/2003 | Aikawa | B41M 5/24 427/555 |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthan et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Kuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 * | 5/2006 | Fugate | A47G 23/0309 248/311.2 |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2008/0285219 A1 * | 11/2008 | Podd | G09F 9/33 361/679.01 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 * | 2/2013 | Van De Ven | F21V 3/04 362/84 |
| 2013/0092965 A1 | 4/2013 | Kijima et al. | |
| 2013/0293104 A1 * | 11/2013 | Wu | B60Q 1/50 315/77 |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Owenthal et al. | |
| 2014/0266666 A1 | 9/2014 | Habibi | |
| 2014/0373898 A1 | 12/2014 | Ogers et al. | |
| 2015/0021937 A1 * | 1/2015 | Perez | B60Q 1/0005 293/115 |

(56) References Cited

U.S. PATENT DOCUMENTS

| | | | |
|---|---|---|---|
| 2015/0021942 A1* | 1/2015 | Evans | B60R 19/50 |
| | | | 293/142 |
| 2015/0022994 A1* | 1/2015 | Bingle | G01D 13/20 |
| | | | 362/23.01 |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0267881 A1* | 9/2015 | Salter | H05B 37/0218 |
| | | | 362/84 |
| 2015/0307033 A1 | 10/2015 | Preisler et al. | |
| 2016/0016506 A1 | 1/2016 | Collins et al. | |
| 2016/0030609 A1 | 2/2016 | Peterson et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0253179 A1 | 9/2017 | Kumada | |
| 2017/0297480 A1* | 10/2017 | Elwell | F21S 43/19 |

FOREIGN PATENT DOCUMENTS

| | | |
|---|---|---|
| CN | 201193011 Y | 2/2009 |
| CN | 103043013 A | 4/2013 |
| CN | 204127823 U | 1/2015 |
| DE | 1120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| FR | 2370606 A1 | 6/1978 |
| GB | 2326265 A | 12/1998 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE ILLUMINATED AIRFLOW CONTROL DEVICE

FIELD OF THE INVENTION

The present invention generally relates to vehicle light systems, and more particularly to vehicle light systems disposed on an exterior portion of the vehicle.

BACKGROUND OF THE INVENTION

Vehicular light systems are generally installed on exterior portions of a vehicle to illuminate an area surrounding the vehicle. It is therefore desired to implement improved light systems for further assistance of vehicle occupants.

SUMMARY OF THE INVENTION

According to one aspect of the present disclosure, a light system is disclosed. The light system includes a bumper assembly disposed on a vehicle. A light source is disposed on the bumper assembly. An airflow control device is disposed below the bumper assembly. A first luminescent structure is disposed on the airflow control device. The first luminescent structure is configured to luminesce in response to receiving excitation light.

According to another aspect of the present disclosure, a vehicle light system is disclosed. The light system includes a bumper assembly disposed on a vehicle. A light source is disposed on the bumper assembly. The light source is operably coupled with a lens. An airflow control device is disposed below the bumper assembly. A controller is configured to selectively activate the light source. The light source directs excitation light towards the airflow control device.

According to yet another aspect of the present disclosure, a light system for a vehicle is disclosed. The light system includes a bumper assembly disposed on a vehicle. A light source is disposed forwardly of an engine compartment. The light source is operably coupled with a lens. The light source emits excitation light towards an airflow control device disposed below the bumper assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
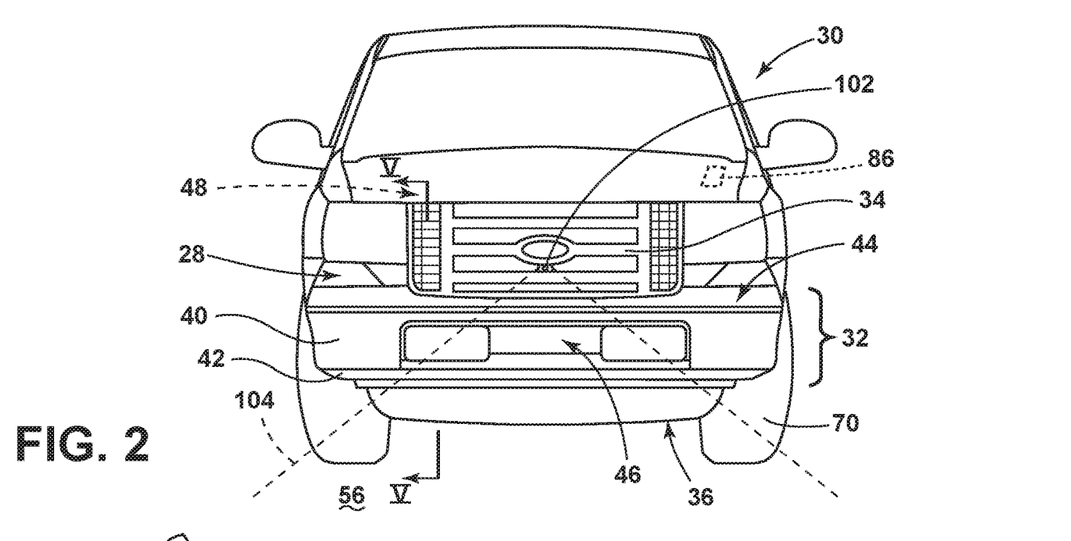
FIG. 2 is a front elevation view of an automotive vehicle having an airflow control device and a light system that is used in conjunction with the airflow control device, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. The light system may employ one or more phosphorescent and/or luminescent structures to luminesce in response to predefined events. The one or more luminescent structures may be configured to convert excitation light received from an associated light source and re-emit the light at a different wavelength generally found in the visible spectrum.

Figure 1A:
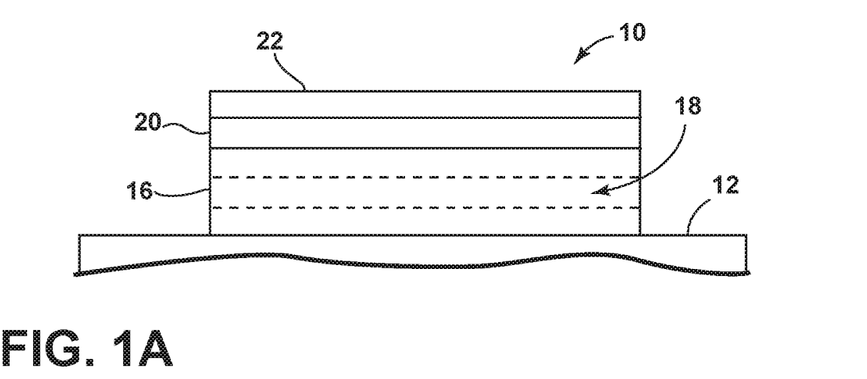
FIG. 1A is a side view of a luminescent structure rendered as a coating, according to various embodiments.
Figure 1B:
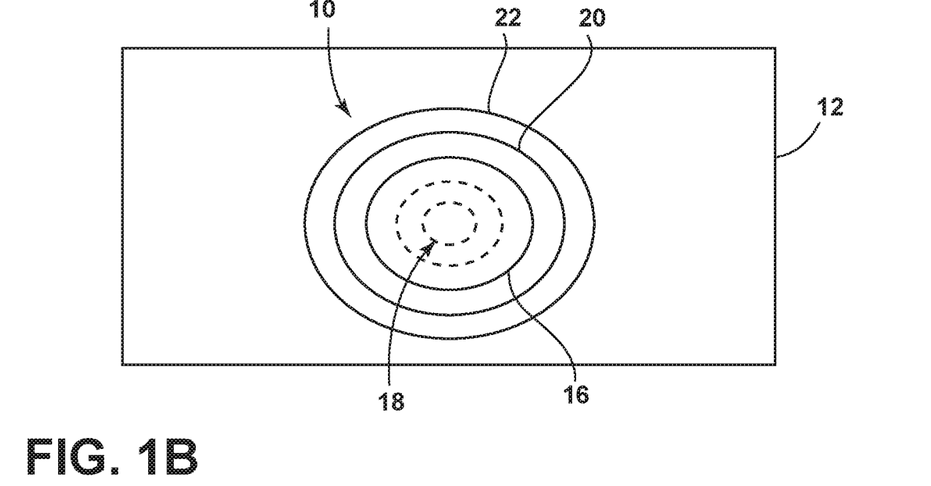
FIG. 1B is a top view of a luminescent structure rendered as a discrete particle, according to various embodiments.
Figure 1C:
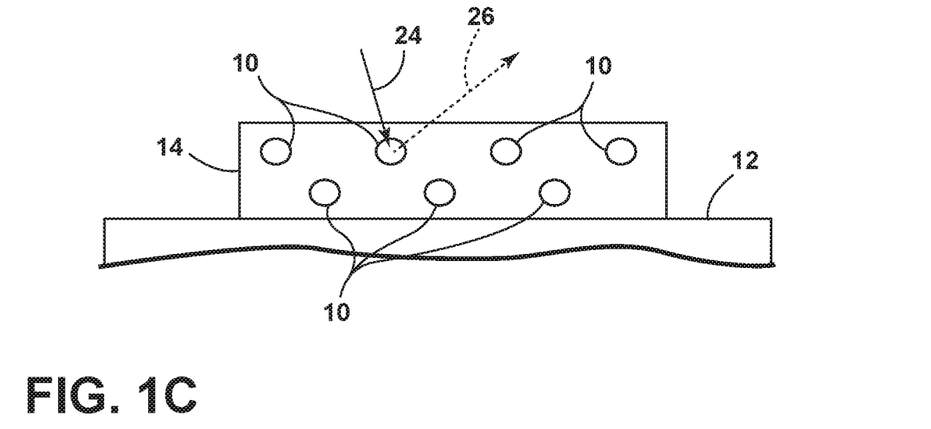
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 80 (FIG. 5) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in their entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/$m^2$. A visibility of 0.32 mcd/$m^2$ is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 80. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 80). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 80 that emit the excitation light 24, including, but not limited to, natural light sources (e.g., the sun) and/or any artificial light sources 80. The periodic absorption of the excitation light 24 from any excitation source may provide for a substantially sustained charge of the long-persistence luminescent material 18 to provide for consistent passive illumination. In various embodiments, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a front portion 28 of an automotive vehicle 30 includes a bumper assembly 32, a grille 34 above the bumper assembly 32, and an airflow control device 36, a lower portion 52 (FIG. 3) of which is visible below the bumper assembly 32. The airflow control device 36 may also be referred to as an "air dam" and may be employed on any type of vehicle 30 without departing from the scope of the present disclosure. As will be described in greater detail herein, the vehicle 30 may employ a light system 38 (FIG. 5) that is incorporated into the front portion 28 of the vehicle 30. The airflow control device 36 provided herein may be used in conjunction with any powertrain component that is benefited by airflow that is located behind the front bumper, such as an engine cooling radiator or an air induction system.

According to various embodiments, the bumper assembly 32 may include a bumper beam 40, which can be formed from stamped steel or other practicable material. The bumper beam 40 may also include various trim components that attach to and/or cover portions of the bumper beam 40 and/or adjacent structures. For example, a lower trim component 42 covers a lower portion 52 of the bumper beam 40 and an upper fascia 44 extends between the grille 34 and the bumper beam 40. The lower trim component 42 and upper fascia 44 may be fabricated from any appropriate material, such as a metallic, polymeric, and/or elastomeric material. The bumper beam 40 may have a central opening 46 to allow cooling airflow to enter a vehicle engine compartment 48 when the vehicle 30 is in motion.

Figure 3:
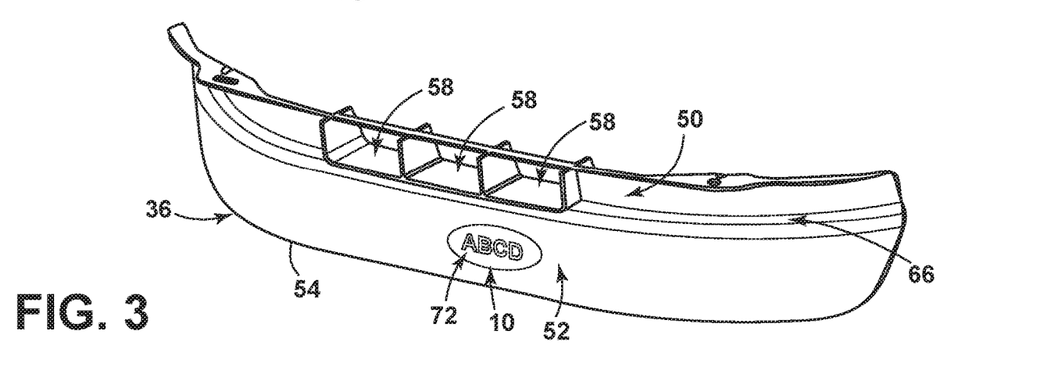
FIG. 3 is a front perspective view of the airflow control device having an emblem on a central portion thereof, according to various embodiments.
Figure 4:
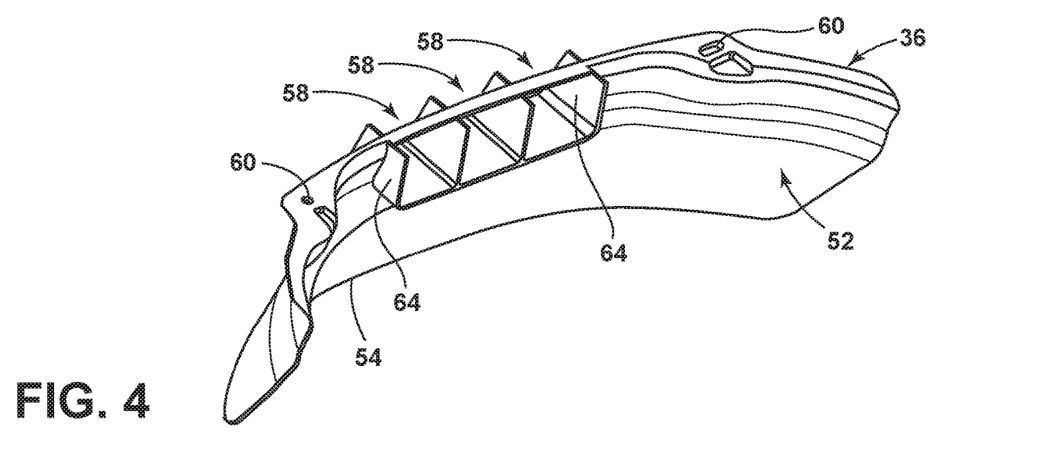
FIG. 4 is a rear perspective view of the airflow control device of FIG. 3, according to various embodiments.

Referring to FIGS. 3 and 4, the airflow control device 36 may include an upper portion 50 and a lower portion 52 connected to and extending downwardly from the scoop portion. The lower edge 54 of lower portion 52 may extend towards a ground surface 56 (FIG. 2), which may provide an aerodynamic benefit. One or more mounting holes 60 are spaced apart on an upper lip of the airflow control device 36. Bolts 62 (FIG. 5) or other appropriate fasteners are used to secure the airflow control device 36 to the vehicle 30.

The upper portion 50 may define one or more separated scoop channels 58. The one or more channels 58 may be disposed between a pair of end walls 64 that are spaced from one another. The scoop channels 58 may assist in directing additional airflow into the engine compartment 48 while the vehicle 30 is in motion.

The lower portion 52 is connected to the upper portion 50 by an intermediate portion 66 extending across a central portion of the airflow control device 36. The intermediate portion 66 may have a double-curved configuration 68 (FIG. 5), such as an S-shape, which allows the lower portion 52 to deflect or fold both rearwardly and forwardly with respect to the upper portion 50. The double-curved cross-sectional shape achieves enough flexibility to allow bi-directional bending/folding without any reduction in the thickness of the material in the intermediate portion 66, thereby maintaining overall strength of the part. This bi-directional folding may assist in avoiding damage to the lower portion 52 that may otherwise occur if it is struck by a vertically projecting obstacle (curb, hump, snow bank, rock, log, etc.) that the vehicle 30 passes over while traveling forward or backing up.

The ability of the lower portion 52 to deflect may allow the airflow control device 36 to be positioned farther forward relative to bumper assembly 32 and to extend closer to the surface 56 of the roadway than would be the case with a rigid part. The disclosed airflow control device 36 may also project into the approach angle of the vehicle 30. The approach angle, as is well known in the automotive arts, is an imaginary line drawn tangent to a front tire 70 (FIG. 2) and extending upward and forward to touch the bottom of the lowest point on the front vehicle structure. If the air dam extends into the approach angle it is more likely to be struck by obstacles as the vehicle 30 begins to climb an incline and/or reverses down an incline and onto a flat surface 56. But because the lower portion 52 of airflow control device 36 may deflect without sustaining any damage, its normal (undeflected) position may be further forward and lower, where it provides greater aerodynamic efficiency benefits and illumination ability proximate a front portion 28 of the vehicle 30. However, it will be appreciated that a non-deflectable air dam may be used in conjunction with the lighting system provided herein without departing from the scope of the present disclosure.

The airflow control device 36 may serve both as an air dam, improving aerodynamic efficiency, and/or as an air scoop, directing airflow entering through the central opening 46 towards an appropriate powertrain component, making efficient use of available packaging space thereby improving manufacturing efficiency. The airflow control device 36 may allow vehicles 10 with air-requiring components in the engine compartment 48 to gain the benefits of an air dam. The scoop portion of the airflow control device 36 may be concealed from view behind the bumper assembly 32.

With further reference to FIG. 3, the luminescent structure 10 may be disposed on the airflow control device 36. The luminescent structure 10 may form indicia 72, such as an emblem, logo, an artistic design (e.g., a cat's eye) or any other desired information that may be visible when the luminescent structure 10 is in a luminescent and/or non-luminescent state. In operation, the luminescent structure 10 receives the excitation light 24 and, in response, luminesces therefrom. According to various embodiments, the luminescent structure 10 may contain long-persistence luminescent material such that the luminescent structure 10 continues to emit light for a period of time after the excitation light 24 is no longer present. For example, according to various embodiments, the luminescent structure 10 may continue to emit light for four hours after the removal of the excitation light 24.

Figures 5, 5A:
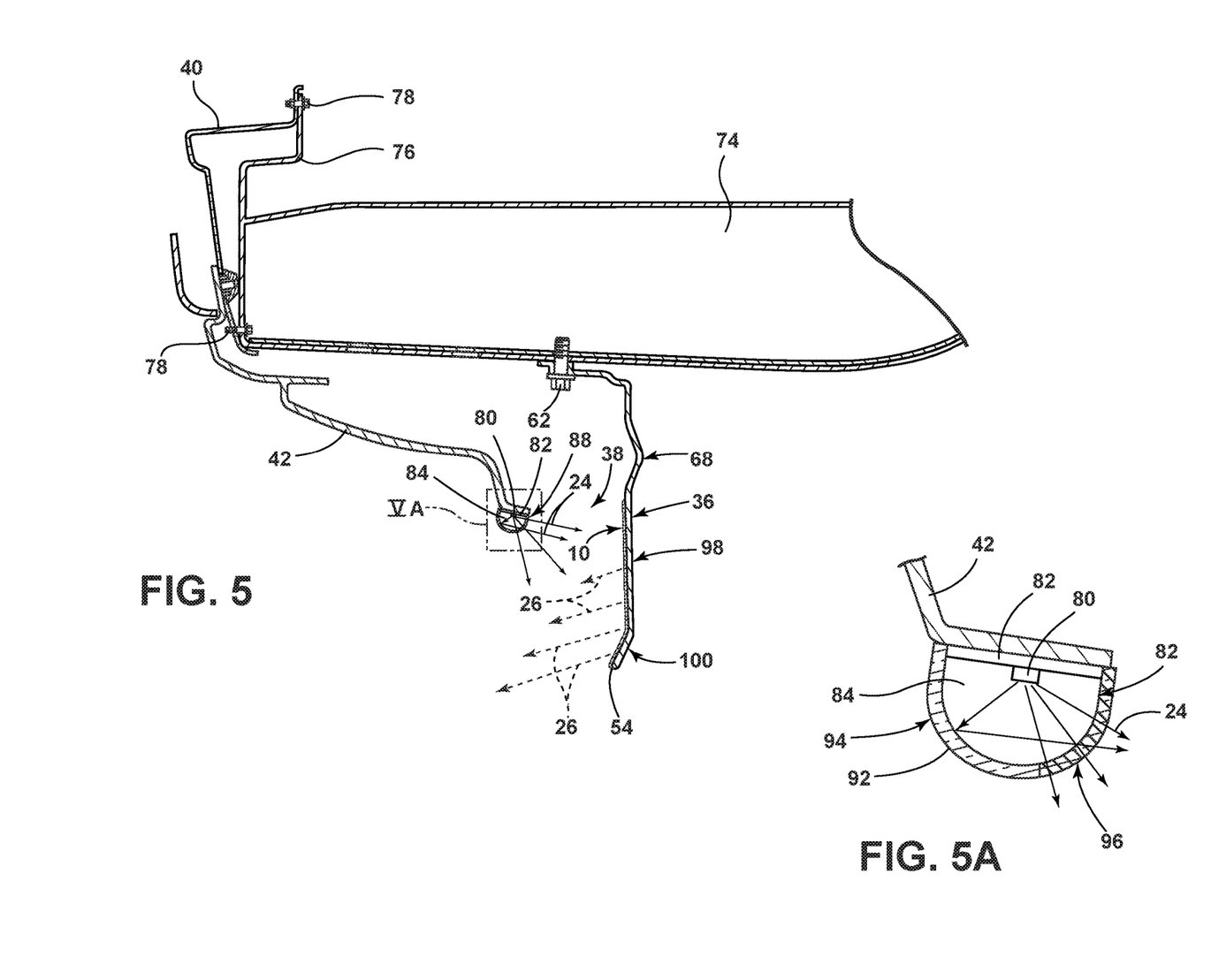
FIG. 5 is a cross-sectional view taken along line V-V of FIG. 2.
FIG. 5A is an enhanced view of the area VA of FIG. 5.

Referring to FIGS. 5 and 5A, the bumper assembly 32 is supported by frame rails 74. The bumper beam 40 may be attached to frame rail 74 by, for example, bumper bracket(s) 76 and fasteners 78. The airflow control device 36 may be attached to the frame rail 74 by bolts 62. The airflow control device 36 may be formed of any desired material including, but not limited to, any metallic, elastomeric, and/or polymeric material, having a desired combination of strength and flexibility for practicable usage on the front portion 28 of the vehicle 30.

The light system 38 includes one or more light sources 80 mounted to one or more circuit board(s) 82, respectively, that are disposed on the bumper assembly 32 and/or otherwise disposed forwardly of an engine compartment 48. The one or more circuit boards 82 may be coupled to any component on the front portion 28 of the vehicle 30, such as the bumper beam 40, and direct excitation light 24 towards the luminescent structure 10. The one or more light sources 80 may be configured to emit visible and/or non-visible light, such as blue light, ultraviolet (UV) light, infrared light, and/or violet light and may include any form of light source 80. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light system 38. Further, various types of LEDs are suitable for use as the light sources 80 including, but not limited to, top-emitting LEDs, side-emitting LEDs, and others. Excitation light 24 generated by the one or more light sources 80 passes generally through a lens 84 to the outside environment when one or more light sources 80 is illuminated.

The one or more circuit board(s) 82 may be configured as a printed circuit board (PCB) containing a controller 86 (FIG. 2) including control circuitry including LED drive circuitry for controlling activation and deactivation of the light sources 80. The controller 86 may be disposed in the vehicle 30 and/or within the light system 38. The circuit board 82 may be configured in any fashion known in the art including, but not limited to, any flexible PCB and/or rigid PCB. The controller 86 may activate the light sources 80 based on a plurality of inputs and may modify the intensity of the emitted wavelengths of excitation light 24 by pulse-width modulation, current control and/or any other method known in the art. In various embodiments, the controller 86 may be configured to adjust a color and/or intensity of the excitation light 24 by sending control signals to adjust an intensity or energy output level of the light sources 80. According to various embodiments, the controller 86 may increase the intensity of excitation light 24 emitted from any of the light sources 80 up to five times steady state. According to various embodiments, multicolored light sources 80, such as Red, Green, and Blue (RGB) LEDs that employ red, green, and blue LED packaging may be used to generate various desired colors of light outputs from a single light source 80, according to known light color mixing techniques.

Each of light sources 80 includes electrical circuitry for receiving electrical power to generate light illumination at a desired wavelength or frequency. In various embodiments, each light source 80 within the light system 38 may generate a light output at a different wavelength. However, in various embodiments, the light sources 80 may emit a wavelength of excitation light 24 in a common spectrum. Additionally, and/or alternatively, the light sources 80 may each emit excitation light 24 within a plurality of spectrums.

The lens 84 is disposed outwardly of the light sources 80 and includes optics 88 to direct the excitation light 24 generated by the light sources 80 towards the airflow control device 36. For example, the lens 84 may be configured as a Fresnel lens, a pillow optic, and/or any other type of lens or optic that is configured to disperse, concentrate, and/or otherwise direct light emitted from the light sources 80 therethrough in any desired manner. The light system 38 provided herein may allow for the use of cost-effective and efficient light sources 80 to achieve a desired light illumination. In various embodiments, a badge 90 (FIG. 6), logo, emblem, decal, etc. may additionally, or alternatively, be disposed on the airflow control device 36 and the light source 80 may illuminate the same.

With further reference to FIGS. 5 and 5A, the lens 84 may be formed from a material that may protect the light system 38 from physical and chemical damage arising from environmental exposure. Accordingly, the lens 84 may have properties such as viscoelasticity (i.e., having both viscosity and elasticity), a low Young's modulus, and/or a high failure strain compared with rigid components of the vehicle 30, such as a window of the vehicle 30. The lens 84 may continue to have flexible properties at low temperatures, such as temperatures below 0 degrees C. According to various embodiments, the lens 84 may be formed from a material containing silicone, urethane, flexible polycarbonate, flexible polypropylene, thermoplastic compositions, thermoset compositions, elastomeric compositions, polymeric compositions, and/or any other flexible and/or moldable material or mixture. In various embodiments, the lens 84 may be may be made of plastic. According to various embodiments, the usage of the materials disclosed herein may provide hydrophobic and/or hydrophilic properties that may assist in repelling some compounds (e.g., oils and greases) dirt, grime, and other contaminants that may come in contact with the vehicle 30 and/or the light system 38.

Referring still to FIGS. 5 and 5A, the luminescent structure 10 may be optically coupled with the light source 80. In operation, the luminescent structure 10 may include a plurality of luminescent materials 18 therein that luminesce in response to receiving light of a specific wavelength spectrum. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

In some embodiments, the light system 38 may include a decorative layer 92 that is configured to control or modify an appearance of the lens 84 and/or any other portion of the light system 38. For example, the decorative layer 92 may be configured to confer an appearance to portions of light system 38, such as the lens 84. In various embodiments, the decorative layer 92 may be tinted any color to complement the vehicle structure on which the light system 38 is to be received. Accordingly, the decorative layer 92 may be utilized to assist in concealing the light system 38 disposed on the front portion 28 of the vehicle 30. The decorative layer 92 can be disposed on the lens 84, and/or any other portion of the light system 38, through any method known in the art, including, but not limited to, sputter deposition, vacuum deposition (vacuum evaporation coating), electroplating, or directly printing onto a component of the light system 38. The decorative layer 92 may be chosen from a wide range of materials and/or colors, including, but not limited to, silver, chrome, copper, bronze, gold, or any other metallic surface. Additionally, an imitator of any metallic material may also be utilized without departing from the teachings provided herein.

In various embodiments, the decorative layer 92 may have a textured or grained surface. The grained surface may be produced by laser etching the light system 38 and may provide for the light system 38 to have a varied or common appearance with proximately disposed components of the vehicle 30.

With further reference to FIGS. 5 and 5A, the decorative layer 92 may have an opaque, translucent, or light non-transmissive first portion 94 of the lens 84. In some embodiments, the first portion 94 may also be reflective. A second portion 96 of the decorative layer 92, or lens 84, may by transparent, translucent, and/or otherwise light transmissive. Accordingly, the excitation light 24 emitted from the light sources 80 may escape the light system 38 through the second portion 96. Thus, the excitation light 24 may be directed outward from the light system 38 in a desired pattern. Moreover, the reflective characteristics of the decorative layer 92, according to some embodiments, may increase the amount of light emitted through the second portion 96. In some embodiments, the decorative layer 92, if present, may only include the first portion 94.

Referring still to FIGS. 5 and 5A, according to various embodiments, the airflow control device 36 may project into the approach angle of the vehicle 30. Accordingly, the airflow control device 36 may have a first vertical region 98 and a second region 100 that project vehicle forward. However, the airflow control device 36 may have any other orientation and/or shape without departing from the scope of the present disclosure.

As the luminescent structure 10 emits converted light, the converted light may be directed forwardly of the vehicle 30. According to various embodiments, the light system 38 may be utilized during a welcome/farewell sequence, meaning the light sources 80 may be illuminated as the driver and/or an occupant of the vehicle 30 approaches and/or exits the vehicle 30. The light system 38 may illuminate a ground surface 56 next to the vehicle 30 to enhance visibility, safety, aesthetics, etc. of the vehicle 30. In addition, due to the arrangement of the light system 38 below of the bumper beam 40, there may be minimal, or no, shadowing of the converted light, i.e., the light distribution is visible on the ground surface 56 around the vehicle 30.

Additionally, and/or alternatively, the light sources 80 may be activated for use in conjunction with an imager 102 (FIG. 2) disposed on the vehicle 30. The imager 102 may provide an image of proximately disposed objects on a display within the vehicle 30. The imager 102 includes an image sensor having an area type image sensor, such as a CCD or a CMOS image sensor, and image-capturing optics. The imager 102 captures an image of an imaging field of view 104 (FIG. 2) defined by the image-capturing optics. In embodiments employing the imager 102, the illumination provided by the light system 38 may illuminate an area within the field of view 104 of the imager 102. Accordingly, the light system 38 may be initiated when the camera is activated, the vehicle 30 is moving below a predefined speed (e.g., five miles per hour), and/or an exterior sensor 106 (FIG. 7) (e.g., proximity sensor) disposed around the vehicle 30 detects the vehicle 30 is moving within a confined space.

Additionally, and/or alternatively, the light system 38 may also be activated in conjunction with one or more fog lamps disposed on the vehicle 30 by providing light that is proximate to the ground surface 56. In such instances, the light system 38 may produce light within a white or selective yellow light spectrum, and may increase the illumination directed towards the road surface 56 in conditions of poor visibility due to rain, fog, dust or snow.

Figure 6:
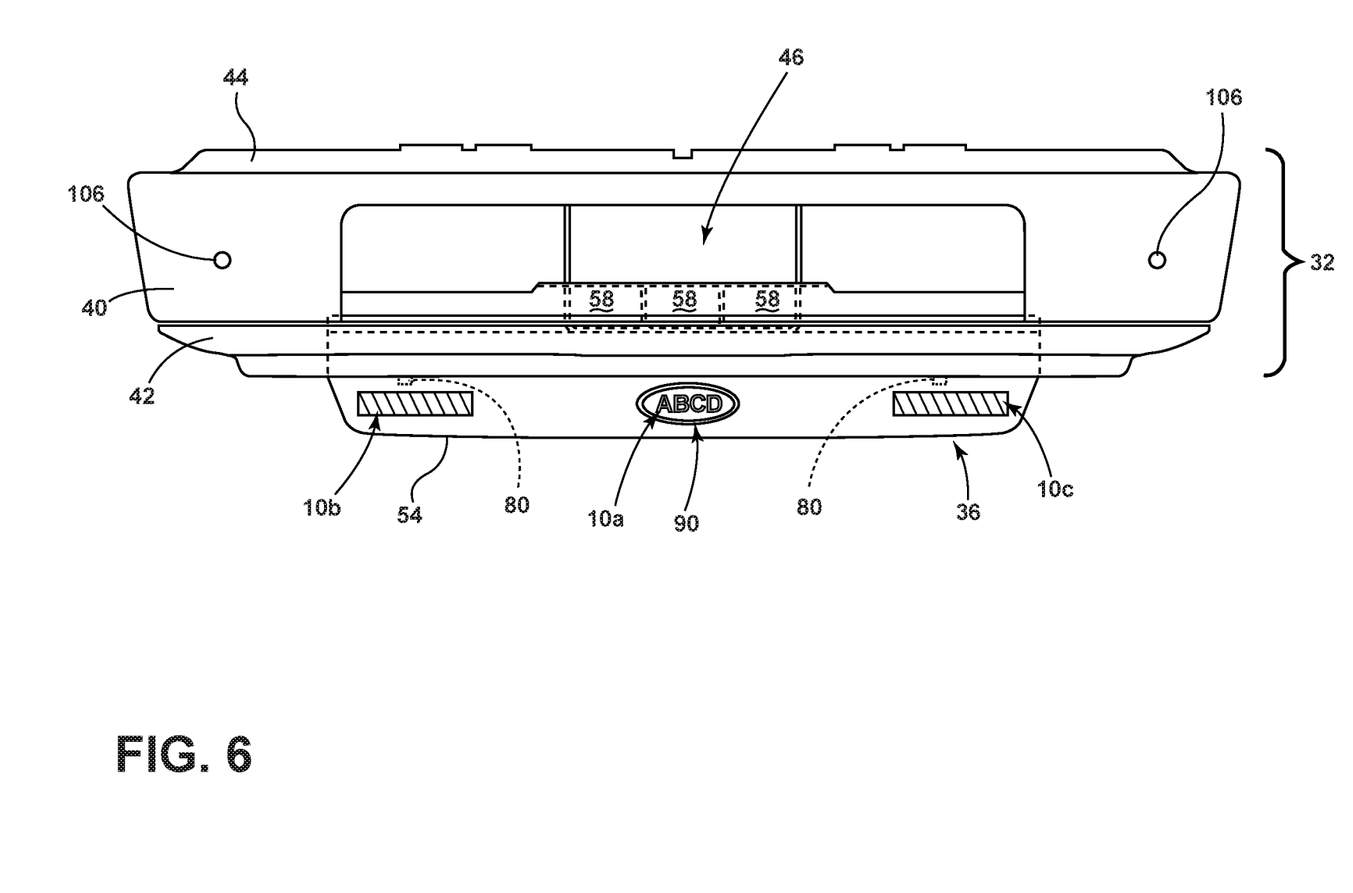
FIG. 6 is a front cut-away view of a vehicle showing the airflow control device and a plurality of luminescent structures disposed on the airflow control device, according to various embodiments.

Referring to FIG. 6, the badge 90 includes a first luminescent structure 10a. The first luminescent structure 10a may be excited by environmental excitation light 24 and/or excitation light 24 provided by one or more light sources 80. Further, the light system 38 may include a second luminescent structure 10b and/or a third luminescent structure 10c. The second luminescent structure 10b may be disposed on a first lateral side of a vehicle centerline and the third luminescent structure 10c may be disposed on a second lateral side of the vehicle centerline. The second and third luminescent structures 10b, 10c may be configured as supplemental turn signals that are independently activated in response to initiation of a turn indicator. As such, the second and/or third luminescent structure 10b, 10c may luminesce in a red light spectrum, an amber light spectrum, or other light spectrum. The light sources 80 may emit a first wavelength of excitation light 24 to excite the first luminescent structure 10a, a second wavelength of excitation light 24 to excite the second luminescent structure 10b, and/or a third wavelength of excitation light 24 to excite the third luminescent structure 10c. Additionally, and/or alternatively, each light source 80 may emit excitation light 24 in a common wavelength spectrum.

Figure 7:
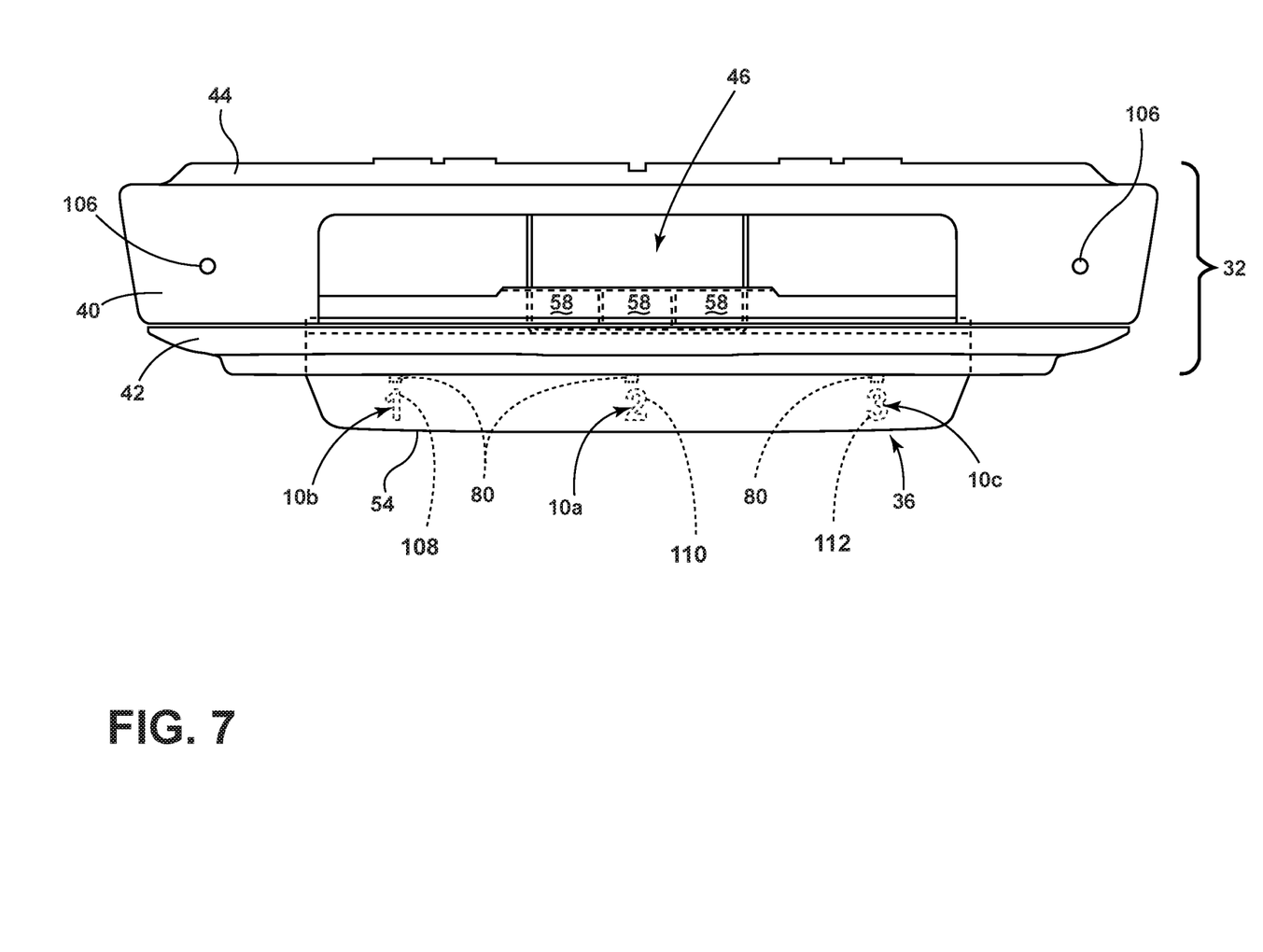
FIG. 7 is a front cut-away view of a vehicle showing the airflow control device and the plurality of luminescent structures disposed on the airflow control device that are configured to sequentially luminesce, according to various embodiments.

Referring to FIG. 7, the light system 38 may sequentially activate the plurality of light sources 80 consecutively one at a time such that a corresponding luminescent structure 10 is excited one at a time at a sufficiently rapid rate to generate an animated lighted image, which has the appearance of a moving image. In one specific, non-limiting embodiment, an image, which may be a logo and may serve as a trademark, may be shown in three different image patterns 108, 110, 112 and may appear to move due to the sequential and rapid consecutive excitation of the luminescent structure 10 that is included within the three image patterns 108, 110, 112. It should be appreciated that other images having different patterns, sizes, and light colors may be generated.

The light system 38 may be activated in response to a user activating the door unlock switch on a key fob when the user is within signal communication range of the vehicle 30. Upon activation of the door unlock switch or button, the light system 38 is turned on to generate the animated luminescent image patterns 108, 110, 112, such as a running mustang. The light system 38 may remain on for a predetermined time period, such as two minutes. Accordingly, the appearance of the moving lighted image provides an animated luminescent image and serves as a puddle lamp to illuminate the ground surface 56 proximate to the front portion 28 of the vehicle 30.

A variety of advantages may be derived from the use of the present disclosure. For example, use of the light system disclosed herein provides additional illumination around the vehicle. The light system may provide illumination in a location of the vehicle that is traditionally difficult to illuminate due to its location and contact with debris and obstacles. The light system provided herein may also provide additional aesthetic detail to the vehicle thereby increasing the safety of the vehicle and/or the perceived value of the vehicle. The light system may be manufactured at low costs when compared to standard vehicle light assemblies.

According to various embodiments, a light system is provided herein. The light system includes a bumper beam disposed on a vehicle. A light source is disposed on the bumper beam. An airflow control device is disposed below the bumper beam. A first luminescent structure is disposed on the airflow control device. The first luminescent structure is configured to luminesce in response to receiving excitation light. The light system may be configured as a vehicle light system. Embodiments of the light system can include any one or a combination of the following features:

- a controller configured to activate the light source based on a plurality of inputs;
- the first luminescent structure may contain long-persistence luminescent material such that the first luminescent structure continues to emit light for a period of time after the excitation light is no longer present;
- the airflow control device has a first vertical portion and a second portion that extends vehicle forward;
- the first luminescent structure is disposed on the second portion, the second portion is configured to direct a converted light vehicle forward;
- an imager, wherein a converted light is directed within a field of view of the imager from the first luminescent structure in response to receiving excitation light;
- a second luminescent structure, wherein the first luminescent structure is disposed on a first side of a vehicle centerline and the second luminescent structure is disposed on a second side of the vehicle centerline;
- the first and second luminescent structures are configured as turn signals that are independently activated in response to initiation of a turn indicator;
- a lens operably coupled with the light source, the lens having hydrophobic and hydrophilic properties; and/or
- the first luminescent structure defines indicia that is visible in a luminescent and non-luminescent state.

Moreover, the light system may be manufactured by positioning a bumper assembly on a vehicle; disposing a light source on the bumper assembly; attaching an airflow control device below the bumper assembly; and disposing a luminescent structure on the airflow control device, wherein the luminescent structure is configured to luminesce in response to receiving excitation light.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A light system, comprising:
a bumper assembly disposed on a vehicle below a grille of the vehicle, wherein the bumper assembly includes a trim component;
a light source disposed on the trim component of the bumper assembly;
an airflow control device disposed at least partially below and rearward of the bumper assembly, wherein the airflow control device includes an upper portion and a lower portion, the upper portion defining one or more openings configured to direct airflow; and
a first luminescent structure disposed on the lower portion of the airflow control device, wherein the first luminescent structure is configured to luminesce in response to receiving excitation light.

2. The light system of claim 1, wherein the upper portion includes one or more channels in communication with the one or more openings and configured to direct airflow through the respective opening.

3. The light system of claim 1, wherein the first luminescent structure defines indicia that is visible in a luminescent and non-luminescent state.

4. The light system of claim 1, wherein the first luminescent structure contains long-persistence luminescent material such that the first luminescent structure continues to emit light for a period of time after the excitation light is no longer present.

5. The light system of claim 1, wherein the lower portion of the airflow control device has a first vertical portion and a second portion, the second portion extending from the first vertical portion forward of the vehicle.

6. The light system of claim 5, wherein the first luminescent structure is disposed on the second portion, the second portion configured such that the first luminescent structure directs a converted light forward of the vehicle.

7. The light system of claim 1, further comprising:
an imager, wherein a converted light is directed within a field of view of the imager from the first luminescent structure in response to receiving excitation light.

8. The light system of claim 1, further comprising:
a second luminescent structure, wherein the first luminescent structure is disposed on a first side of a vehicle centerline and the second luminescent structure is disposed on a second side of the vehicle centerline.

9. The light system of claim 8, wherein the first and second luminescent structures are configured as turn signals that are independently activated in response to initiation of a turn indicator.

10. The light system of claim 1, further comprising:
a lens operably coupled with the light source, the lens having hydrophobic and hydrophilic properties.

11. A vehicle light system, comprising:
a bumper assembly disposed on a vehicle, the bumper assembly including a trim component extending downward from a bumper beam;

a light source disposed on the trim component of the bumper assembly, the light source operably coupled with a lens;

an airflow control device coupled with a frame rail of the vehicle and disposed at least partially below and rearward of the bumper assembly; and a controller configured to selectively activate the light source, wherein the light source directs excitation light towards the airflow control device.

12. The vehicle light system of claim 11, further comprising:

a first luminescent structure disposed on the airflow control device, wherein the first luminescent structure is configured to luminesce in response to receiving excitation light.

13. The vehicle light system of claim 11, further comprising:

first, second, and third luminescent structures operably coupled with the light source, wherein the first, second, and third luminescent structures are consecutively illuminated.

14. The vehicle light system of claim 11, wherein the lens includes optics therein to direct excitation light from the light source towards the airflow control device, the airflow device including at least one luminescent structure which in turn, redirects converted light forwardly of the vehicle.

15. The vehicle light system of claim 14, wherein the at least one luminescent structure of the airflow control device directs the converted light forward of the vehicle and within a field of view of an imager disposed on the vehicle.

16. A light system for a vehicle, comprising:

a bumper assembly disposed on a vehicle and including a trim piece;

an airflow control device including an upper portion coupled with a lower portion by a double curved intermediate portion, the airflow control device disposed at least partially rearward of the trim piece; and a light source disposed forwardly of an engine compartment and positioned on the trim piece, the light source operably coupled with a lens, wherein the light source emits excitation light towards the lower portion of the airflow control device.

17. The light system for a vehicle of claim 16, further comprising:

a first luminescent structure disposed on the lower portion of the airflow control device and selectively excited by light from the light source.

18. The light system for a vehicle of claim 17, further comprising:

second and third luminescent structures, wherein the light source emits a first wavelength of excitation light to excite the first luminescent structure, a second wavelength of excitation light to excite the second luminescent structure, and a third wavelength of excitation light to excite the third luminescent structure.

19. The light system for a vehicle of claim 18, wherein the light system sequentially activates the light source to excite the first and second luminescent structures one at a time to generate an animated lighted image.

20. The light system for a vehicle of claim 16, wherein the lens is configured from a material containing silicone.

* * * * *